United States Patent [19]

Golin

[11] Patent Number: 5,787,207
[45] Date of Patent: Jul. 28, 1998

US005787207A

[54] METHOD AND APPARATUS FOR MINIMIZING BLOCKINESS IN RECONSTRUCTED IMAGES

[76] Inventor: Stuart J. Golin, 626 Dutch Neck Rd., East Windsor, N.J. 08520

[21] Appl. No.: 583,537

[22] Filed: Jan. 5, 1996

Related U.S. Application Data

[63] Continuation of Ser. No. 134,469, Oct. 12, 1993, abandoned, which is a continuation of Ser. No. 815,638, Dec. 30, 1991, abandoned.

[51] Int. Cl.[6] ............................................. G06K 9/40
[52] U.S. Cl. .................................... 382/254; 382/268
[58] Field of Search ............................. 382/268, 236, 382/238, 103, 254, 232

[56] References Cited

U.S. PATENT DOCUMENTS

| | | | |
|---|---|---|---|
| 4,754,492 | 6/1988 | Malvar | 358/433 |
| 4,941,042 | 7/1990 | Martens | 358/133 |
| 4,941,043 | 7/1990 | Jass | 358/133 |
| 5,126,841 | 6/1992 | Tanaka et al. | 358/105 |
| 5,146,326 | 9/1992 | Hasegawa et al. | 358/166 |
| 5,220,616 | 6/1993 | Downing et al. | 382/54 |

OTHER PUBLICATIONS

G.J. Sullivan and R.L. Baker, "Motion Compensation For Video Compression Using Control Grid Interpolation", May, 1991, CH2977, 1991 IEEE, pp. 2713–2716.

M. Ohta, N. Yano, T. Nishitani, "Entropy Coding For Wavelet Transform of Image And Its Application For Motion Picture Coding", Nov. 1991, SPIE vol. 1605 Visual Communications And Image Processing 1991, pp. 456–466.

B. Ramamurthi and A. Gersho, "Nonlinear Space–Variant Postprocessing Of Block Coded Images", Oct. 1986, IEEE Transactions On Acoustics, Speech and Signal Processing, vol. ASSP, 34, No. 5, pp. 1258–1268.

*Primary Examiner*—Yon J. Couso
*Attorney, Agent, or Firm*—N. Stephan Kinsella, Esq.; William H. Murray, Esq.

[57] ABSTRACT

Information for forming a predicted image having at least two blocks sharing a common border is evaluated to determine whether a discontinuity exists at the common border. If it is determined that a discontinuity exists at the border, the predicted image is filtered in the vicinity of the border.

10 Claims, 3 Drawing Sheets ns on Acoustics, Speech and Signal Processing, Vol. ASSP-34, No. 5, October 1986.

METHOD AND APPARATUS FOR MINIMIZING BLOCKINESS IN RECONSTRUCTED IMAGES

This is a continuation of application Ser. No. 08/134,469 filed on Oct. 12, 1993 now abandoned, which is a continuation of application Ser. No. 07/815,638 filed on Dec. 30, 1991 now abandoned.

FIELD OF THE INVENTION

This invention relates to video signal processing generally and particularly to systems for encoding and decoding a compressed digital video signal representative of a full color video signal.

BACKGROUND OF THE INVENTION

In image compression, it is common to encode an image in two stages. In the first stage the image is "predicted", and in the second stage prediction errors are encoded. There are several ways in which an image may be predicted. For example, it is common to predict a block of pixels in an image from another block of pixels in a previously decoded image. In general, the two blocks will be at different locations in their respective images, and the displacement between these locations must then be encoded. One may also predict a block of pixels by a mathematical function, such as a low-order polynomial. The simplest example of such a function is a constant. In this sense, the DC term of the DCT method can be considered to be a prediction.

Many techniques of digital image compression begin by tiling an image into blocks. These blocks are commonly rectangles 8×8 pixels in dimension. Although the blocks are typically rectangular, other shapes are possible. In an extreme case, an image might be divided into two blocks: a small rectangular block and a larger block which includes the rest of the image surrounding the smaller block.

Whenever the prediction of two adjacent blocks is discontinuous, a discontinuity of pixel values at their common border is almost inevitable. An obvious example where the prediction of two adjacent blocks is discontinuous occurs when the blocks are predicted with different constants. Another example occurs when blocks are predicted from another image with different displacement vectors. A third example occurs when one block is predicted from another image and the other is predicted by a polynomial. In such instances, encoding often introduces discontinuities at block boundaries. Unless these discontinuities coincide with other discontinuities in the original image (such as those at the boundaries of objects), the discontinuities introduced by encoding may tend to give the image a blocky appearance. The resulting image may often be so blocky that it is difficult to recognize. This "blocking effect" is discussed generally in "Nonlinear Space Variant Postprocessing of Block Coded Images" by B. Rahamurthi and A. Gersho, *IEEE Transactions on Acoustics, Speech and Signal Processing*, Vol. ASSP-34, No. 5, October 1986.

In analyzing a typical video sequence, it is apparent that the principal change occurring between successive frames is the inhomogeneous motion of the objects within the frame. The compression of sequences of images, and in particular sequences of naturally occurring images such as those represented by a digital video signal, often relies upon this highly redundant nature of successive images in the sequence. It has been recognized that an accurate apparatus and method of estimating and compensating for the motion of objects within a frame enables the construction of an interframe data compression method and apparatus which can have substantially better performance than can be achieved by sending a signal (such as DPCM) representative merely of the difference between successive frames. Co-pending U.S. patent application Ser. No. 704,945, filed May 23, 1991, now U.S. Pat. No. 5,134,478, which is assigned to the assignee of the present application and the contents of which are incorporated herein by reference, describes a method and apparatus for video compression employing such motion compensation techniques.

In the motion compensation system of the '945 patent application, displacement vectors describing the motion of regions of pixels between image frames are determined over various regions of the current image, and this data is encoded and transmitted to a receiver along with an encoded error information data signal. The various regions in the current image described by the displacement vectors are non-overlapping. The error information data signal represents the difference between a current image and a predicted image constructed from the application of displacement vectors to a previous image. At the receiver, the compensation process is performed on a previous reconstructed image using motion information (displacement vectors) provided by the transmitter. The error signal data provided by the transmitter is then added to the motion compensated receiver image in order to reconstruct a final image.

The motion compensation system described in the '945 application employed a method wherein each image in a sequence was compressed and decompressed based upon the content of a previous image. A target image in a sequence of images was divided into a plurality of blocks of pixels, each block comprising a predetermined number of pixels. A target region comprising at least one pixel block was selected from the target image. The image preceding the target image was analyzed in order to locate a region of the preceding image most closely matching the target region of the target image. If no motion occurred, the preceding and target regions had the same coordinates within the image frame. If motion had occurred, the preceding region was offset or translated relative to the target region by an amount represented by a displacement vector. This displacement vector was encoded for subsequent use by a decoder in decoding the compressed video signal.

In view of the fact that natural images do not neatly decompose into blocks, it was found that discontinuities were introduced between blocks with different displacements. Such a discontinuity is illustrated in the example of FIG. 1 in which there is shown a previous image 100 and a predicted image 150. Previous image 100 includes moving object 110 located near the upper right corner of the image. In predicted image 150, moving object 110 shifts downward and to the left. The left half of previous image 100 is light, while the right half of previous image 100 is dark except where moving object 110 is found. Moving object 110 is gray in tone.

In forming predicted image 150 from previous image 100, predicted image 150 is first tiled into blocks 155. Predicted image 150 is constructed from previous image 100 using motion compensation techniques. More particularly, displacement vectors generated during motion compensation analysis are used to reflect the positional change of a block mapped from previous image 100 into predicted image 150. In the example shown, displacement vectors have been used to map blocks $B_1$ and $B_2$ from previous image 100 in predicted image 150. Block $B_1$ is displaced downward as it is brought from previous image 100 to predicted image 150, and block $B_2$ is displaced downward and to the left as it is brought from previous image 100 to predicted image 150. In cases such as the example shown, where blocks $B_1$, $B_2$ are displaced different amounts, discontinuity 160 typically appears in the predicted image 150 at the border between $B_1$ and $B_2$. It can be seen that discontinuity 160 resulted from the fact that moving object 110 did not neatly fit within block B2. Discontinuities such as discontinuity 160 can produce annoying vertical and horizontal edges in a predicted image. An image suffering from such discontinuities will appear blocky.

As shown in the example of FIG. 1, discontinuities are likely to occur during block-based motion compensation encoding when adjacent blocks in a predicted image have been assigned different displacement vectors. Block-based motion compensation encoding typically does not introduce discontinuities between adjacent blocks having the same displacement. If a discontinuity exists in a predicted image between adjacent blocks having the same displacement, then the discontinuity most likely existed in the previous image since the adjacent blocks are moved as a unit. Such discontinuities in a predicted image between adjacent blocks having the same displacement vectors are typically part of the prediction errors and may be eliminated through accurate encoding of such errors if sufficient bits are available to do so.

Further examples where block-based encoding may introduce discontinuities between adjacent blocks occur where a block cannot be reasonably predicted from a previous image. In such cases, a block is typically predicted by a polynomial or an average value in the current image. Where one of two adjacent blocks is predicted from the previous image and the other block is predicted in any other way, it is likely that a discontinuity will be introduced between them. More generally, one expects discontinuities in adjacent blocks whenever the blocks are predicted in different ways, or in the same way with different parameters.

It is an object of the present invention to minimize the blockiness which is generated in connection with predicted images.

It is a further object of the present invention to minimize blockiness in images where the prediction of two adjacent blocks is discontinuous.

It is a still further object of the present invention to minimize discontinuities occurring at the boundaries of motion compensated regions.

Further objects and advantages of the invention will become apparent from the description of the invention which follows.

SUMMARY OF THE INVENTION

Information for forming a predicted image having at least two blocks sharing a common border is evaluated to determine whether a discontinuity exists at the common border. If it is determined that a discontinuity exists at the border, the predicted image is filtered in the vicinity of the border.

DETAILED DESCRIPTION OF THE PREFERRED EMBODIMENT

Figure 2:
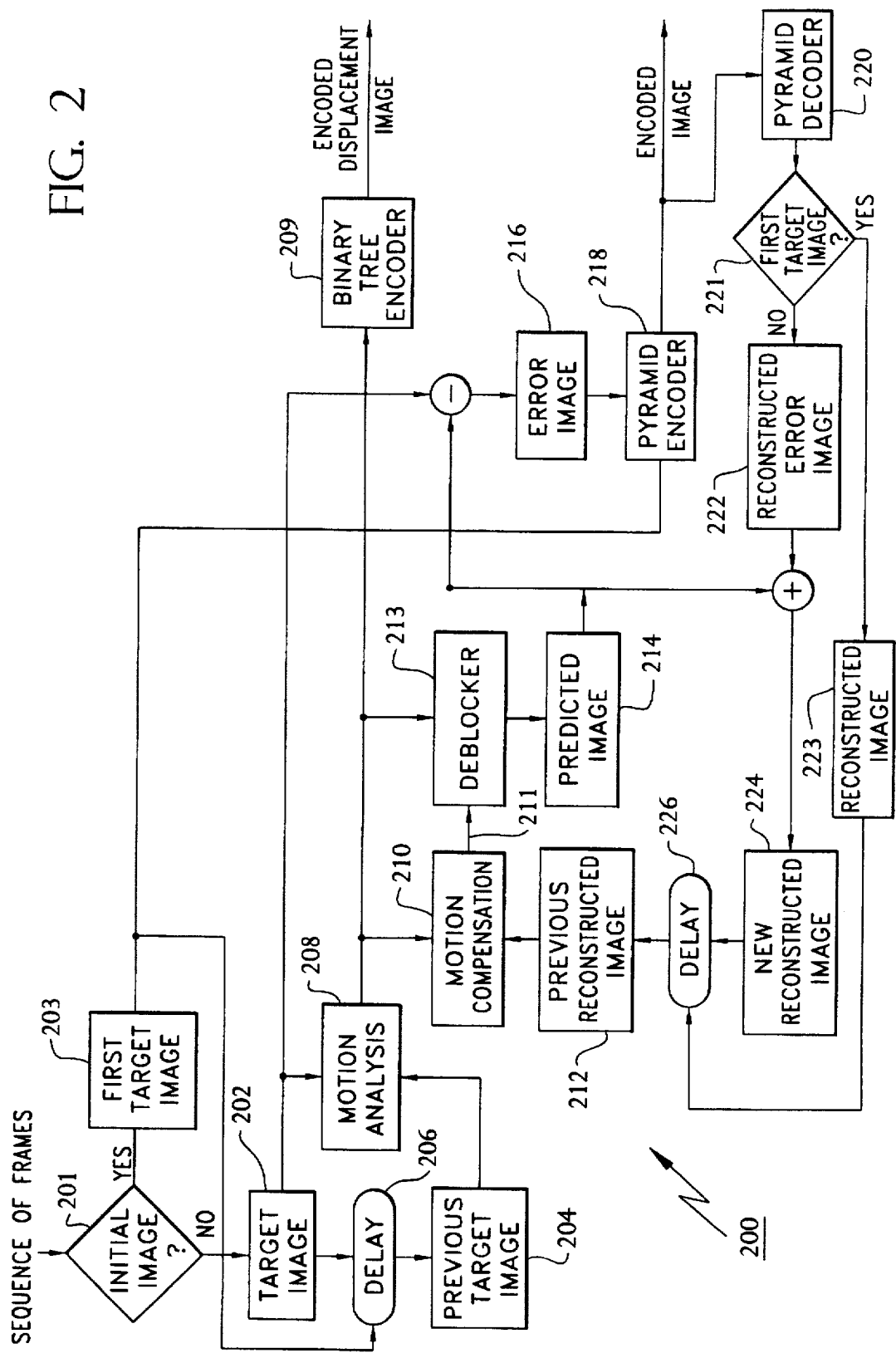
FIG. 2 is a block diagram for encoding images according to the present invention.

Referring now to FIG. 2, there is shown a block diagram of a method, generally designated 200, of encoding a full motion color video digital signal in accordance with the present invention. The method comprises the steps of selecting 201 a target image 202 from a sequence of frames of a digital motion video signal. The target image 202 is an image, other than the first image of the sequence of images, which is being compressed and encoded. The first image of the sequence is defined, for purposes of this detailed description, as a first target image 203 which is treated differently, as will be subsequently described. Since the target image 202 is not the first image in the sequence, a previous target image 204 is provided. In one embodiment, the previous target image 204 is the image which immediately precedes the target image 202 in the sequence of images. In the block diagram of FIG. 2, this is represented by the delay 206. This delay is accomplished by storing the target image 202 in a first memory device for a predetermined period of time, preferably one frame period, whereby the target image becomes the previous target image for purposes of motion analysis 208. In the case of a full motion color video signal which is displayed at the rate of 30 frames per second, the delay 206 represents a delay of 1/30th of a second.

The displacement vectors resulting from the motion analysis 208 are also used in performing motion compensation 210. In motion compensation 210, the displacement vectors from the motion analysis 208 are applied to a previous reconstructed image 212 to form an unfiltered predicted image 211. Each block of the unfiltered predicted image 211 is initially taken from the previous reconstructed image 212, from the location specified by the displacement vector. If the value of a displacement vector is not an integer number of pixels, then the pixel values for that vector are calculated by interpolation, preferably linear interpolation. Deblocker 213 provides predicted image 214 by filtering discontinuities found at the boundaries of or borders between motion compensated pixel blocks in unfiltered predicted image 211. The pixel values of the predicted image 214 are subtracted from corresponding pixel values in the target image 202 to form an error image 216. At least one level of resolution of the error image 216 is selected and encoded by a pyramid encoder 218. The pyramid encoder 218 is capable of selecting and encoding the full resolution level only; the full resolution level and at least one lower level of resolution; or at least one level of resolution lower than the full resolution level but not the full resolution level. By using deblocker 213 to filter discontinuities prior to the formation of error image 216, the high frequency content of error image 216, and hence the number of bits needed to encode that image, are reduced.

The encoded error image is subsequently used by a decoder in decoding the compressed digital video signal as will be subsequently described. The encoded error image is also decoded by a pyramid decoder 220 to form a reconstructed error image 222. The pixel values of the reconstructed error image 222 are added to the corresponding pixel values of the predicted image 214 to form a reconstructed image 224. After a delay 226 of one frame period, the reconstructed image 224 becomes the previous reconstructed image 212. In the preferred embodiment, this delay is accomplished by storing the reconstructed image 224 in a second memory device for one frame period.

As previously stated, the above description pertains to all target images 202 in the sequence of images except the first image. In the case of the first image of the sequence of images, the method comprises selecting 201 a first target image 203. The first target image 203 is encoded by the pyramid encoder 218 in accordance with the technique previously described with respect to encoding the error image 216. The encoded first target image is subsequently used by the decoder in decoding the compressed digital video signal. The encoded first target image is also decoded by the pyramid decoder 220 and since this is the decoded first target image 221, it forms a reconstructed image 223 which is stored in the second memory device to become the previous reconstructed image 212. The first target image 203 is also stored in the first memory device thereby becoming the previous target image 204. The first target image 203 remains as the previous target image 204 until it is replaced in the first memory device by the next previous target image which is a delayed 206 target image 202 as previously described.

Figure 3:
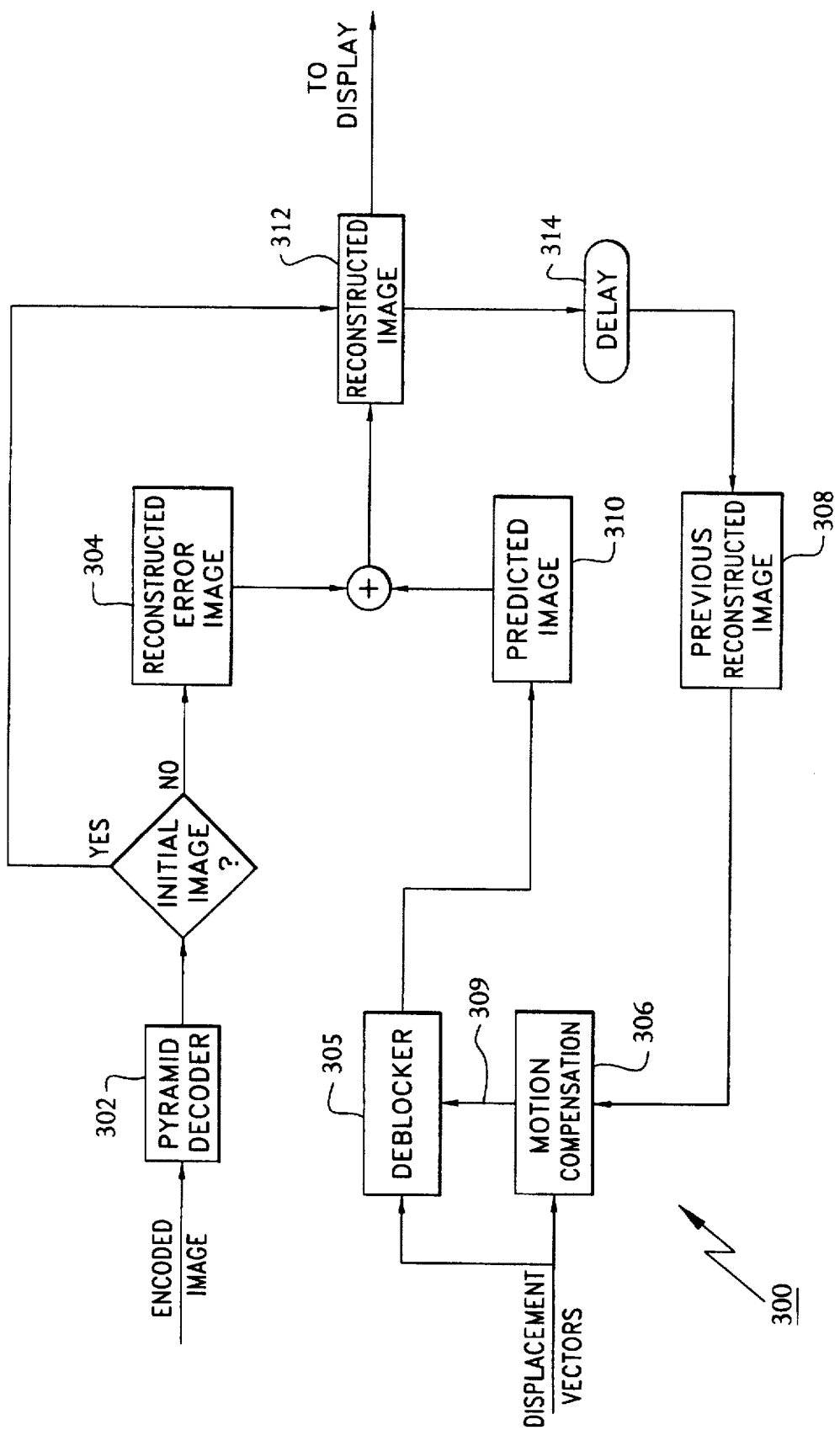
FIG. 3 is a block diagram for decoding images according to the present invention.

Referring now to FIG. 3 there is shown a block diagram of a method, generally designated 300, of decoding an encoded full motion color video digital signal in accordance with the present invention. In accordance with the method 300, each selected encoded resolution level of the encoded error image is decoded by a pyramid decoder 302 to form a reconstructed error image 304. The encoded displacement vectors are decoded. In the preferred embodiment, the unfiltered predicted image 309 is formed in the same manner as previously described for forming the unfiltered predicted image 211 during compression. Deblocker 305 provides predicted image 310 by filtering discontinuities found at the boundaries of or borders between motion compensated pixel blocks in unfiltered predicted image 309. The pixel values of the predicted image 310 are added to the corresponding pixel values of the reconstructed error image 304 to form a reconstructed image 312. The reconstructed image 312 is subsequently displayed as part of the sequence of images. The reconstructed image is also delayed 314 to form the previous reconstructed image 308. This delay is accomplished by storing the reconstructed image 312 in a memory device for a predetermined period of time, preferably one frame period.

Figure 1A:
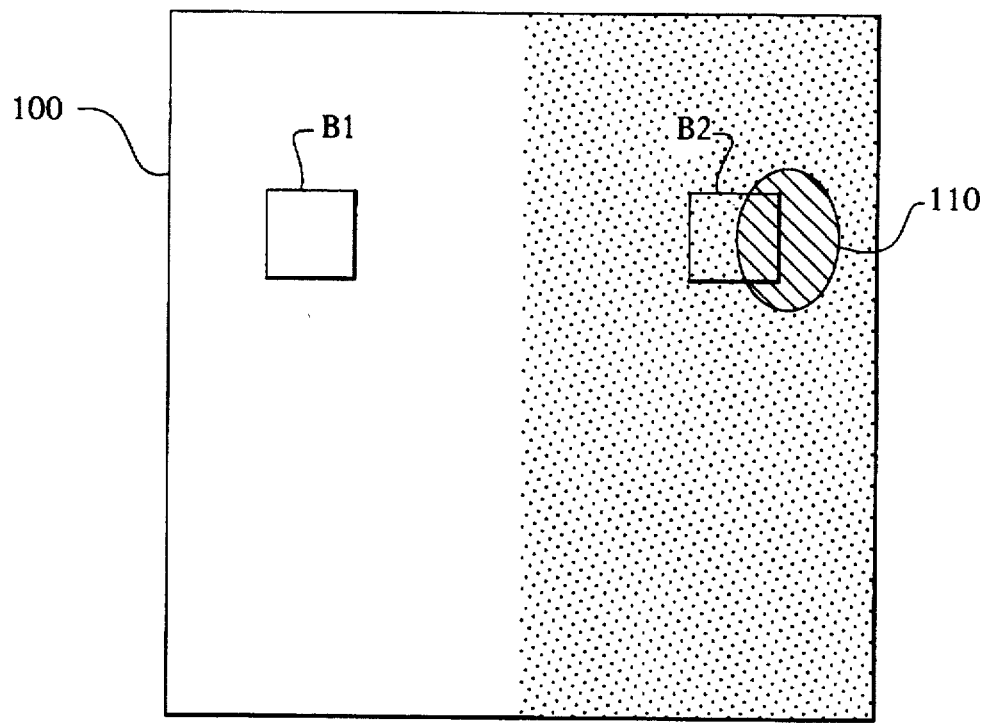
FIG. 1 depicts an exemplary image having a discontinuity between two motion compensated blocks of pixels.
Figure 1B:
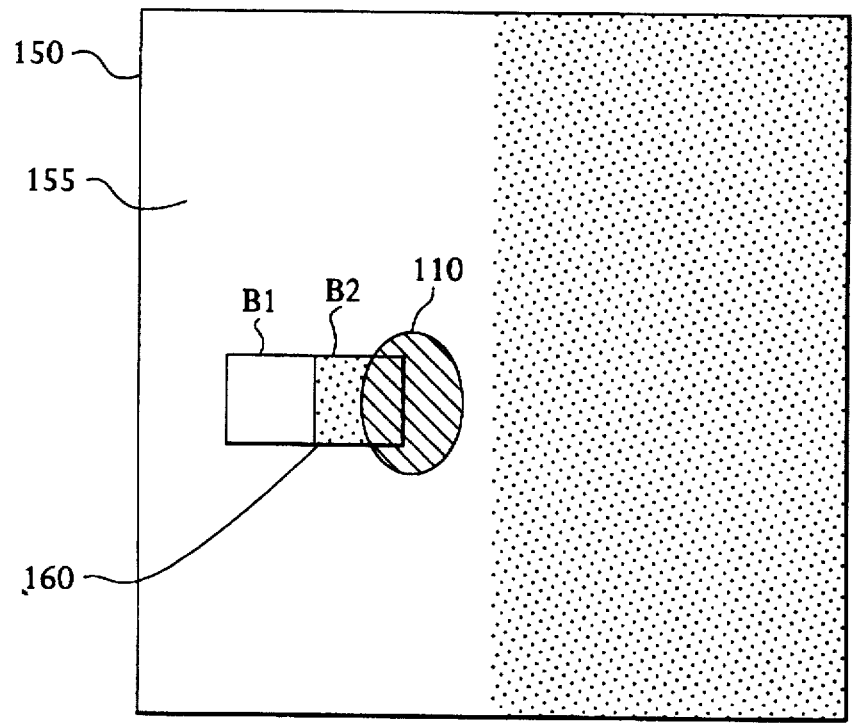

Referring now to Tables I and II below, there is shown an illustration of the operation of a deblocker according to the present invention which may be employed to filter discontinuities of the type exemplified by discontinuity 160 shown in FIG. 1. Discontinuity 160 resulted from the adjacent positioning of two motion compensated blocks described by different displacement vectors. The deblocker of the present invention may also be employed to filter discontinuities at a common border of two adjacent blocks in a predicted image (i) where one of the two adjacent blocks is predicted from a previous image and the other block is predicted by a polynomial or an average value, or (ii) where the two adjacent blocks are predicted from different polynomials or average values.

Table I below is a pixel by pixel representation of blocks $B_1$ and $B_2$ from FIG. 1. As shown in Table I, $B_1$ and $B_2$ are each 8×8 pixels in dimension. Each pixel in $B_1$ which is light in tone is represented by an "8"; each pixel in $B_2$ which is dark in tone is represented by an "0"; and each gray toned pixel in moving object 110 is represented by a "4". Discontinuity 160 occurs at the boundary between $B_1$ and $B_2$.

TABLE I

| $B_1$ | | | | | | | | $B_2$ | | | | | | | |
|---|---|---|---|---|---|---|---|---|---|---|---|---|---|---|---|
| 8 | 8 | 8 | 8 | 8 | 8 | 8 | 8 | 0 | 0 | 0 | 0 | 0 | 0 | 4 | 4 |
| 8 | 8 | 8 | 8 | 8 | 8 | 8 | 8 | 0 | 0 | 0 | 0 | 0 | 4 | 4 | 4 |
| 8 | 8 | 8 | 8 | 8 | 8 | 8 | 8 | 0 | 0 | 0 | 0 | 4 | 4 | 4 | 4 |
| 8 | 8 | 8 | 8 | 8 | 8 | 8 | 8 | 0 | 0 | 0 | 0 | 4 | 4 | 4 | 4 |
| 8 | 8 | 8 | 8 | 8 | 8 | 8 | 8 | 0 | 0 | 0 | 0 | 4 | 4 | 4 | 4 |
| 8 | 8 | 8 | 8 | 8 | 8 | 8 | 8 | 0 | 0 | 0 | 0 | 4 | 4 | 4 | 4 |
| 8 | 8 | 8 | 8 | 8 | 8 | 8 | 8 | 0 | 0 | 0 | 0 | 0 | 4 | 4 | 4 |
| 8 | 8 | 8 | 8 | 8 | 8 | 8 | 8 | 0 | 0 | 0 | 0 | 0 | 0 | 4 | 4 |

During operation of a deblocker according to the present invention, a low pass filter is targeted at or near the vicinity of a discontinuity. In a preferred embodiment, the filtering is applied in a direction normal to the borders of the subject motion compensated pixel blocks. Table II below illustrates how the pixels shown in Table I appear after application of a low pass filter in the vicinity of the border between motion compensated pixel blocks $B_1$, $B_2$. In the example shown, a ¼ (1, 2, 1) filter has been applied in a direction normal to the border between motion compensated blocks $B_1$, $B_2$ at a depth of one pixel on either side of the border.

TABLE II

| $B_1$ | | | | | | | | $B_2$ | | | | | | | |
|---|---|---|---|---|---|---|---|---|---|---|---|---|---|---|---|
| 8 | 8 | 8 | 8 | 8 | 8 | 8 | 6 | 2 | 0 | 0 | 0 | 0 | 0 | 4 | 4 |
| 8 | 8 | 8 | 8 | 8 | 8 | 8 | 6 | 2 | 0 | 0 | 0 | 0 | 4 | 4 | 4 |
| 8 | 8 | 8 | 8 | 8 | 8 | 8 | 6 | 2 | 0 | 0 | 4 | 4 | 4 | 4 | 4 |
| 8 | 8 | 8 | 8 | 8 | 8 | 8 | 6 | 2 | 0 | 0 | 4 | 4 | 4 | 4 | 4 |
| 8 | 8 | 8 | 8 | 8 | 8 | 8 | 6 | 2 | 0 | 0 | 4 | 4 | 4 | 4 | 4 |
| 8 | 8 | 8 | 8 | 8 | 8 | 8 | 6 | 2 | 0 | 0 | 4 | 4 | 4 | 4 | 4 |
| 8 | 8 | 8 | 8 | 8 | 8 | 8 | 6 | 2 | 0 | 0 | 0 | 4 | 4 | 4 | 4 |
| 8 | 8 | 8 | 8 | 8 | 8 | 8 | 6 | 2 | 0 | 0 | 0 | 0 | 0 | 4 | 4 |

As a result of the targeted filtering, a discontinuity no longer appears at the border between motion compensated blocks $B_1$, $B_2$ and the blockiness which earlier appeared has thereby been minimized. It has been found that such highly targeted filtering at the borders between motion compensated pixel blocks yields satisfactory results while causing little unnecessary blurring.

Although the example of Table I and II showed application of a specific filter at a given direction and depth, it is to be understood that other targeted filtering techniques, including filtering at other directions and depths, can also be applied in the vicinity of the boundaries or borders of pixel blocks to minimize blockiness. For purposes of this invention, targeted filtering is considered to occur in the vicinity of a block border so long as the filtering is not performed throughout the entire block.

In the preferred embodiment, targeted filtering at a boundary between two motion compensated blocks is normally applied when the difference in the displacement vectors describing the blocks exceeds a predetermined threshold. However, an exception is made where the blocks are functionally related (derived from the same function) as when they are part of a large (multi-block) rotating object within the image or when the camera zooms in on an object. In such a case, the boundary between the blocks is not filtered.

Referring again to FIG. 3, it is shown that deblocker 305 has as its inputs both unfiltered predicted image 309 and information representing the displacement vectors used during motion compensation 306 to form unfiltered predicted image 309 from previous reconstructed image 308. In a preferred embodiment, deblocker 305 determines the existence of discontinuities in unfiltered image 309 by comparing the subject displacement vectors used to form unfiltered image 309 with each other. More particularly, deblocker 305 determines the existence of a discontinuity when pixel blocks which are adjacent to one and other are shifted or offset by different amounts during motion compensation 306. Thus, deblocker 305 may determine the existence of a discontinuity by comparing displacement vectors which have been applied to pixel blocks which are adjacent. In a preferred embodiment, a discontinuity will be determined to exist when the difference between two subject displacement vectors exceeds a predetermined threshold and filtering will then be applied along the common border of the subject pixel blocks. In such a preferred embodiment, the magnitude of the difference between the two subject displacement vectors may also determine the strength of filtering used. Thus, for example, if the difference in subject displacement vectors barely exceeds a predetermined threshold a relatively weak filter is used, while if the difference is larger a stronger filter is applied at the location of the discontinuity. In further embodiments, pixel values may be compared at the boundaries of the subject motion compensated blocks to detect or locate more precisely discontinuities within the boundaries. In such an embodiment, filtering will be applied only at those pixel locations along a subject border where a discontinuity has been located or detected.

In selecting which particular method to use during decoding to detect or locate a discontinuity, the speed with which such detection can be performed is a critical design parameter. The particular method employed for detecting or locating discontinuities must be made to function during decoding at the general decoding speed which, in the case of digital video, is recognized typically to be thirty frames-per-second. As an alternative to performing most processing relating to the detection of discontinuities by simply comparing displacement vectors during decoding, in a further preferred embodiment of the present invention "side information" generated during encoding operations is transmitted and used during decoding to facilitate the detection of discontinuities. For example the side information could correspond to a series of bits, each of which represents a border between tiled blocks in an image. The bit would be set to "0" if no discontinuity was present and to "1" if a discontinuity warranting filtering were present at the subject border. In a further embodiment, multiple bits could be used for each border to represent one of two or more filters to be applied at the subject border. In this alternative, some portion of the transmission stream must be allocated for the side information and thus cannot be available for other information representative of the compressed video signal.

The present invention may be embodied in other specific forms without departing from the spirit or essential attributes of the invention. Accordingly, reference should be made to the appended claims, rather than the foregoing specification, as indicating the scope of the invention.

What is claimed is:

1. A method for forming an output digital video signal representative of at least one filtered image from an input digital video signal representative of at least one predicted image, said predicted image having first and second blocks, said first and second blocks sharing a common border, the method comprising the steps of:

(a) determining with a decoder prediction information representative of how said first and second blocks were predicted;
(b) determining with the decoder in accordance with said prediction information whether a discontinuity due to differences in how said first and second blocks were predicted exists at said border;
(c) forming with the decoder a filtered image by filtering said first and second blocks in the vicinity of said border if and only if a discontinuity exists at said border; and
(d) forming with the decoder said output digital video signal from said filtered image.

2. The method of claim 1, wherein a discontinuity will be determined to exist in step (b) if said first and second blocks have been predicted by different displacement vectors.

3. The method of claim 1, wherein a discontinuity will be determined to exist in step (b) if said first block has been predicted by a displacement vector and said second block has been predicted by a polynomial.

4. The method of claim 1, wherein a discontinuity will be determined to exist in step (b) if said first and second blocks have been predicted by first and second polynomials, said first polynomial being unequal to said second polynomials.

5. The method of claim 1, wherein said filtering is one-dimensional and normal to said border.

6. An apparatus for forming an output digital video signal representative of at least one filtered image from an input digital video signal representative of at least one predicted image, said predicted image having first and second blocks, said first and second blocks sharing a common border, the apparatus comprising:

(a) means for determining prediction information representative of how said first and second blocks were predicted;
(b) means for determining in accordance with said prediction information whether a discontinuity due to differences in how said first and second blocks were predicted exists at said border;
(c) means for forming a filtered image by filtering said first and second blocks in the vicinity of said border if and only if a discontinuity exists at said border; and
(d) forming said output digital video signal from said filtered image.

7. The apparatus of claim 6, wherein a discontinuity will be determined to exist by said means for determining whether a discontinuity exists if said first and second blocks have been predicted by different displacement vectors.

8. The apparatus of claim 6, wherein a discontinuity will be determined to exist by said means for determining whether a discontinuity exists if said first block has been predicted by a displacement vector and said second block has been predicted by a polynomial.

9. The apparatus of claim 6, wherein a discontinuity will be determined to exist by said means for determining whether a discontinuity exists if said first and second blocks have been predicted by first and second polynomials, said first polynomial being unequal to said second polynomial.

10. The apparatus of claim 6, wherein said means for forming a filtered image is comprised of filtering means for filtering said first and second blocks in one-dimension and in a direction normal to said border.

* * * * *